US012123641B2

(12) United States Patent
Rommelmann

(10) Patent No.: US 12,123,641 B2
(45) Date of Patent: Oct. 22, 2024

(54) OPENING DEVICE FOR A COOLING DEVICE

(71) Applicant: HETTICH-ONI GMBH & CO. KG, Vlotho (DE)

(72) Inventor: Cord Rommelmann, Burhave (DE)

(73) Assignee: Hettich-ONI GmbH & Co. KG, Vlotho (DE)

( * ) Notice: Subject to any disclaimer, the term of this patent is extended or adjusted under 35 U.S.C. 154(b) by 385 days.

(21) Appl. No.: 17/602,350

(22) PCT Filed: Mar. 19, 2020

(86) PCT No.: PCT/EP2020/057656

§ 371 (c)(1),
(2) Date: Oct. 8, 2021

(87) PCT Pub. No.: WO2020/207750

PCT Pub. Date: Oct. 15, 2020

(65) Prior Publication Data

US 2022/0163254 A1 May 26, 2022

(30) Foreign Application Priority Data

Apr. 11, 2019 (DE) ..................... 10 2019 109 650.2

(51) Int. Cl.
*F25D 23/10* (2006.01)
*E05F 15/616* (2015.01)
*F25D 23/02* (2006.01)

(52) U.S. Cl.
CPC ............ *F25D 23/10* (2013.01); *E05F 15/616* (2015.01); *F25D 23/028* (2013.01);
(Continued)

(58) Field of Classification Search
CPC .................. E05F 15/616; E05F 15/611; E05Y 2201/426; E05Y 2201/624; E05Y 2400/65;
(Continued)

(56) References Cited

U.S. PATENT DOCUMENTS 9,285,156 B2 3/2016 Linke
2004/0205935 A1* 10/2004 Lautenschlaeger ....... E05F 5/10 16/374
(Continued)

FOREIGN PATENT DOCUMENTS

DE 102013103819 A1 10/2014
DE 102014107367 A1 11/2015
(Continued)

OTHER PUBLICATIONS

International Search Report mailed Jul. 6, 2020 in related/corresponding International Application No. PCTEP2020/057656.
(Continued)

*Primary Examiner* — Hiwot E Tefera
(74) *Attorney, Agent, or Firm* — PATENT PORTFOLIO BUILDERS PLLC

(57) ABSTRACT

An opening device, for a cooling device having a door assembly, includes a mounting base, which can be mounted on provided securing units for a door hinge of the cooling device, and a functional unit having an ejection element, which can be moved out in an electrically controlled manner. The mounting base has contacts and the functional unit has counter contacts. The contacts and the counter contacts contact one another when the functional unit is secured on the mounting base in order to supply the functional unit with current.

14 Claims, 13 Drawing Sheets

(52) U.S. Cl.
CPC ... *E05Y 2201/426* (2013.01); *E05Y 2201/624* (2013.01); *E05Y 2400/65* (2013.01); *E05Y 2600/528* (2013.01); *E05Y 2600/626* (2013.01); *E05Y 2900/31* (2013.01); *F25D 2400/40* (2013.01)

(58) Field of Classification Search
CPC ......... E05Y 2600/528; E05Y 2600/626; F25D 23/028; F25D 23/10; F25D 2400/40
See application file for complete search history.

(56) References Cited

U.S. PATENT DOCUMENTS

| | | | | |
|---|---|---|---|---|
| 2008/0100189 | A1* | 5/2008 | Huber | A47B 88/463 312/319.1 |
| 2009/0206715 | A1* | 8/2009 | Scheffknecht | E05B 65/463 312/319.8 |
| 2009/0302724 | A1* | 12/2009 | Allard | B67D 3/00 312/237 |
| 2011/0048060 | A1* | 3/2011 | Kim | E05B 17/0029 62/449 |
| 2011/0083461 | A1* | 4/2011 | Kim | E05F 15/619 62/449 |
| 2012/0080991 | A1* | 4/2012 | Wilson | F25D 23/028 312/405 |
| 2014/0306596 | A1 | 10/2014 | Linke | |
| 2015/0338156 | A1* | 11/2015 | Held | E05D 7/00 312/405 |
| 2018/0202706 | A1* | 7/2018 | Lee | F25D 29/005 |
| 2018/0283066 | A1* | 10/2018 | Lee | E05F 1/00 |
| 2018/0283077 | A1* | 10/2018 | Lee | E05D 3/16 |
| 2018/0347892 | A1* | 12/2018 | Kim | F25D 29/00 |
| 2019/0169910 | A1* | 6/2019 | Im | F25D 23/028 |

FOREIGN PATENT DOCUMENTS

| | | | |
|---|---|---|---|
| EP | 2292995 | B1 | 9/2014 |
| EP | 3327384 | A1 | 5/2018 |
| WO | 2018007240 | A1 | 1/2018 |

OTHER PUBLICATIONS

Search Report created Feb. 5, 2020 in related/corresponding DE Application No. 10 2019 109 650.2.

Written Opinion mailed Jul. 6, 2020 in related/corresponding International Application No. PCTEP2020/057656.

* cited by examiner

OPENING DEVICE FOR A COOLING DEVICE

BACKGROUND AND SUMMARY OF THE INVENTION

Exemplary embodiments of the invention relate to an opening device for a cooling device having a door assembly, wherein the opening device comprises a mounting base mountable on provided securing units for a door hinge of the cooling device and comprises a functional unit having an ejection element that is extendable under electrical control.

Cooling devices commonly used in the home, such as refrigerators or freezers, typically have a hinged door that is sealed to the body of the cooling device with a circumferential seal. To provide adequate thermal insulation without leakage between the insulating body and the insulating door, the circumferential seal is typically designed as a magnetic seal that applies locking forces between the door and the body. In addition, the door hinges may be equipped with a self-closing feature that provides additional locking forces. Finally, after a refrigerator or freezer door is dosed, a negative pressure forms in the hermetically sealed interior due to the warmer air that has entered and then cools inside, adding another component to the locking force.

For more convenient handling of such a cooling device, the opening devices mentioned at the beginning are known, in which an ejection element can be extended from a housing in an electrically driven manner, by means of which the door of the cooling device is pushed open at least to such an extent that the door can be conveniently reached behind and can then be fully opened manually.

Such an opening device is known, for example, from EP 2 292 995 B1. The opening device described there is mounted on an upper side of the cooling device and presses with its ejection element against an upper projecting edge of the door of the cooling device. The opening device has a coil in which an armature is displaceably mounted. The armature is held in a rest position by a spring element and disengages when the coil is energized. The disengaging armature acts on the door via a lever mechanism to open it at least a gap width. Placing the opening device on top of the refrigeration unit is often undesirable for design reasons. In addition, the top of a free-standing cooling device can only be used as a placement area to a limited extent. Furthermore, a refrigerator with an opening device positioned in this way is only suitable for installation in a furniture cabinet to a limited extent, since the opening device projecting upwards beyond the insulating cabinet of the refrigerator would result in an only partially closed gap between the refrigerator and a top panel or shelf of the furniture body.

WO 2018/007240 A1 discloses an opening device of the type mentioned above. This is characterized in that it can be mounted on a front end face of an insulating body of the cooling device on provided securing units for a door hinge of the cooling device using a mounting bracket. Furthermore, the opening device is configured to act with its ejection element on an area of the door assembly located outside the seal. The opening device thus makes advantageous use of the installation space for the door hinges provided as standard in the cooling device and also makes use of the securing units for the door hinges already prepared in this context.

If the opening device is ins tailed in this installation space, a connection cable must be run from this installation space between the cooling device and a furniture body in which the cooling device is installed. This connection scheme makes it difficult to replace the opening device in case of service or repair.

Exemplary embodiments of the present invention are directed to an opening device for a cooling device that can be used in the installation space provided for the door hinges and that can be easily replaced for service or repair purposes.

An opening device of the type mentioned above according to the invention is characterized in that the mounting base has contacts and the functional unit has mating contacts, wherein the contacts and the mating contacts contact each other when the functional unit is fastened to the n our ting base to supply power to the functional unit.

Due to the two-part design of the opening device with mounting base and functional unit, whose contacts/mating contacts make contact with each other when the functional unit is mounted, the functional unit can be easily replaced without having to disconnect or reconnect the wiring of a connecting cable or having to re-route a connecting cable, Replacement of the functional unit can be carried out, for example, for repair, service, and/or cleaning purposes. The replacement can be performed by the user or an unskilled service technician.

The contacts of the mounting base are preferably connected to a connecting cable, which has power supply lines and optionally signal lines.

For mechanical fastening of the functional unit to the mounting base, the mounting base and the functional unit have securing units that engage with each other In an advantageous design. Preferably, the securing units are designed in such a way that the functional unit can be fastened to the mounting base without tools. The securing units comprise, for example, latching means, guide webs, hooks, eyelets and/or undercuts.

For fastening the mounting base, the base has mounting holes for connection to the cooling device and preferably also for connection to a furniture body in which the cooling device is accommodated (inserted). For this purpose, the mounting base can be L-shaped, for example. The preferred installation location of the opening device is the installation space for the door hinges provided as standard on the cooling device. It is then particularly advantageous to also make use of the securing units of the door hinges already prepared in this context for fastening the mounting base. This results in a simple retrofitting capability of an opening device according to the invention for a large number of cooling devices which are already available on the market. In addition, no installation space that can be used elsewhere, for example on a top side of the cooling device, is occupied. Finally, there is no need to intervene in the insulating body beyond the securing units of the door hinges, which are present anyway.

The mounting base can then also be used to advantageously define a minimum distance between the furniture body and the cooling device for passing through the connection cable.

In order to be arranged in the available installation space, the housing of the opening device advantageously has a depth of less than 60 millimeters (mm), preferably less than 47 mm or preferably between 38 and 47 mm.

In a preferred design of the opening device, the ejection element has a maximum stroke of 40 mm to 80 mm. With such a stroke, the door assembly can be opened far enough to overcome the locking force of the (magnetic) seal and the negative pressure in the interior of the cooling device. The door assembly can then be conveniently reached behind to open it fully. At the same time, the door assembly is preferably only opened by the opening device to such an extent that it is still within the self-closing range of the door hinges, if these are equipped with a self-closing mechanism. If the door assembly is not opened manually, it then doses automatically after the ejection element is retracted again.

In a further advantageous design of the opening device, the ejection element is pivotably mounted on a base body and, in a position where it is not pivoted out, surrounds the base body in a hood-like manner on at least four sides. Preferably, the opening device has a pivoting dement pivotably mounted on the base body and having at least one internally located gear segment coupled to an electric motor via a drive gear and can be pivoted by the motor relative to the base body. The pivoting element thereby moves the ejection element, preferably via at least one roller arranged eccentrically on the pivoting element, which roller moves along a guide curve of the ejection element.

The guide curve enables a larger pivot angle of the ejection element than would result from the rotary motion of the pivoting dement alone. By shaping the guide curve, it is also possible to influence the angular dependence of the movement of the ejection element depending on the angle of rotation of the pivoting element. In this way, the most effective ejection movement possible can be achieved, which has a large ejection force at the beginning of the movement sequence, which is advantageous for overcoming magnetic locking forces of the door assembly of the cooling device. This is followed by an ejection with a higher speed in order to be able to eject the door assembly far enough.

In a further advantageous design, the opening device has an apron that is pivotably mounted on the base body or the ejection element and extends between the base body and the ejection element as a pinch protection. Preferably, the apron is positively guided along by the pivoting element and/or the ejection element in at least one direction of movement. The forced movement of the apron ensures that it is always in a suitable position in which it prevents a finger, for example, from becoming trapped when the ejection element is retracted.

In a further advantageous design of the opening device, the electric motor is coupled to the drive gear via a worm gear. In this way, a suitable transmission ratio can be achieved in a space-saving manner with only one gear stage. Preferably, the electric motor is mounted in or on the base body in a vibration-damping manner. This ensures that the opening device operates as quietly as possible.

BRIEF DESCRIPTION OF THE DRAWING FIGURES

The invention is explained in more detail below with reference to figures, wherein:

FIGS. 1*a*, 1*b* each show an isometric view of a cooling device with an open door from different viewing directions;

FIGS. 2*a*, 2*b* show detailed views from FIGS. 1*a*, 1*b*, which show in more detail the arrangement of an opening device and a door hinge, respectively, in the cooling device of FIGS. 1*a*, 1*b*;

FIG. 2*c* shows a detailed illustration from FIGS. 1*a*, 1*b*, which show in more detail an installation space for a door hinge or opening device;

FIGS. 3*a*, 3*b* each show a side view of a first exemplary embodiment of an opening device in various mounting states;

Figure 8A:
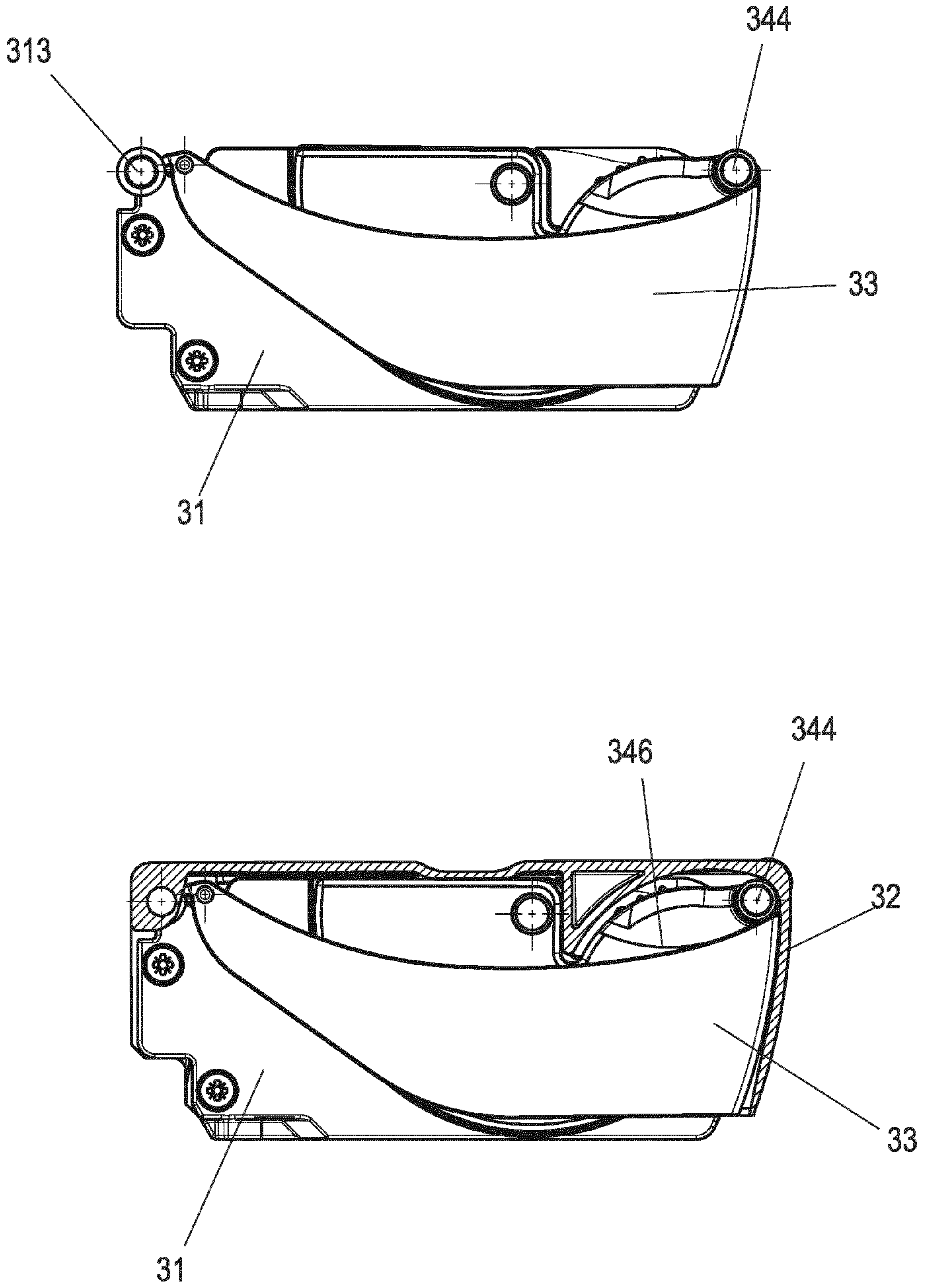
Figure 8B:
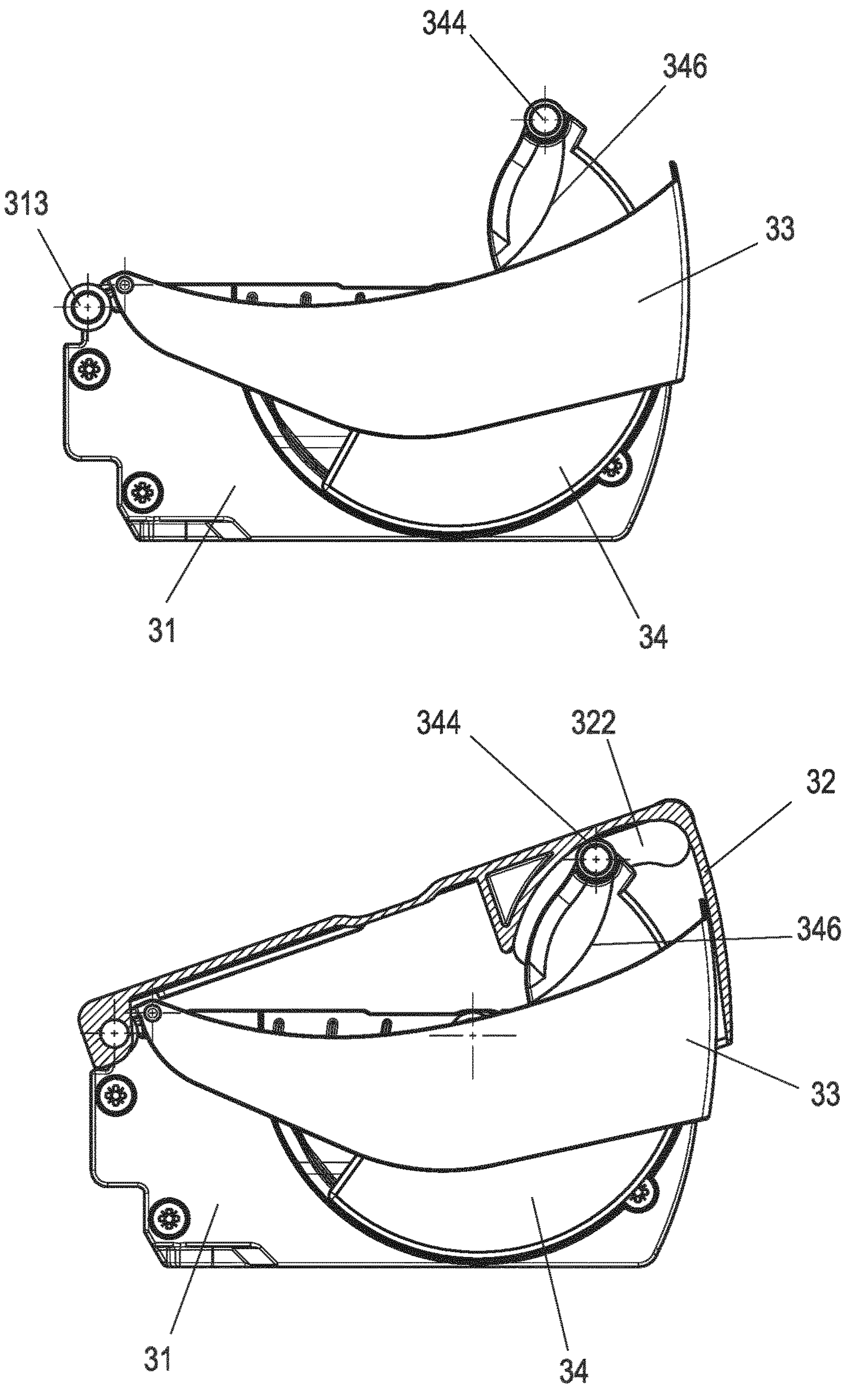
Figure 8C:
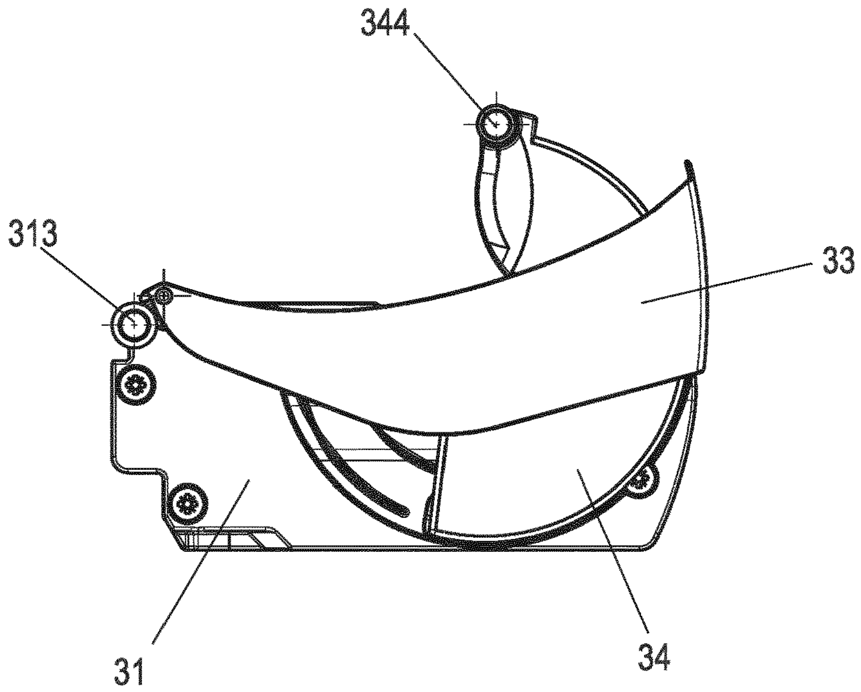
Figure 8C:
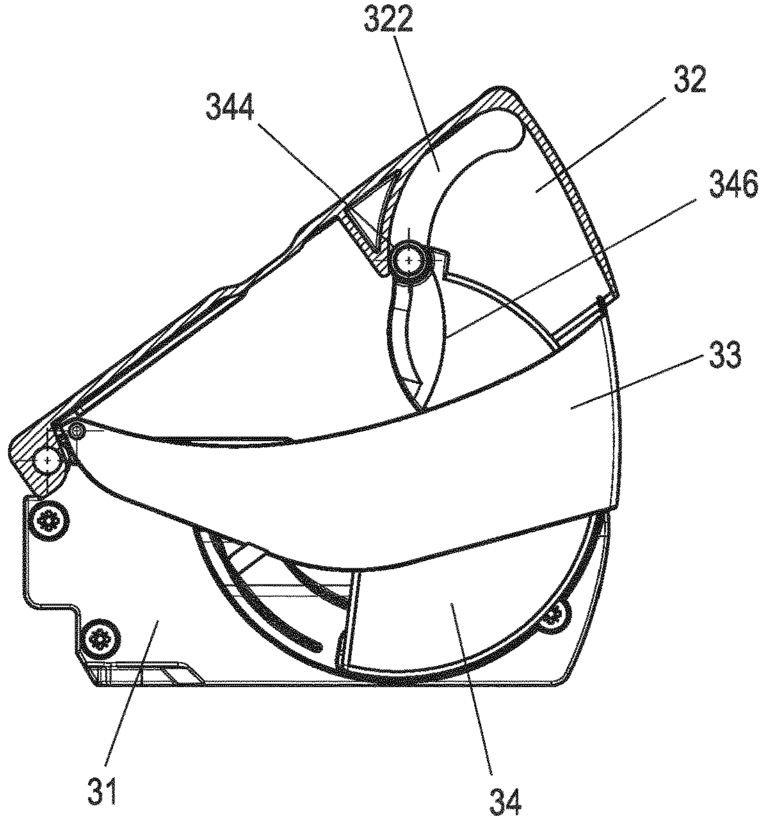
Figure 9:
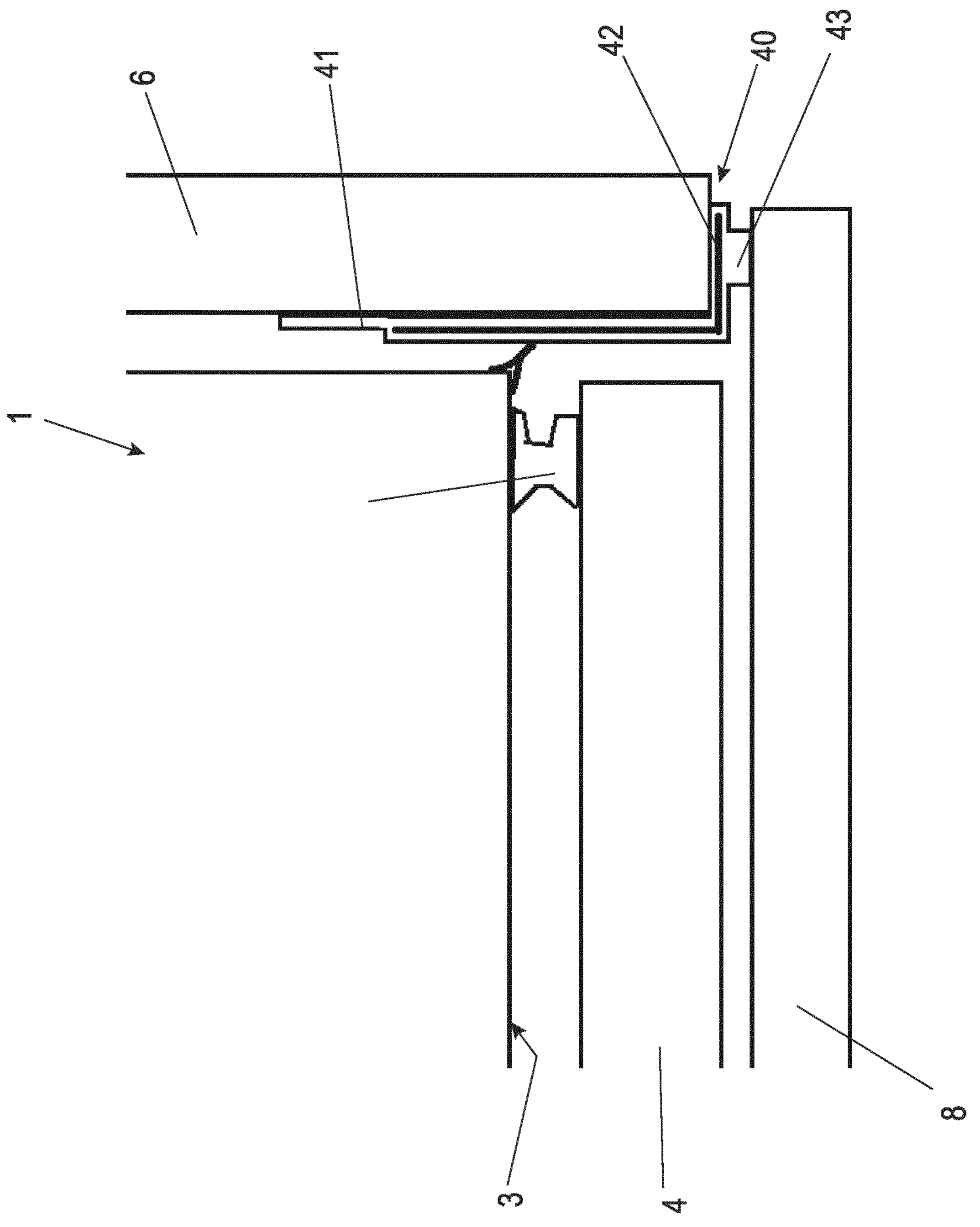

FIGS. 8*a*-8*c* shows in each case a side and a sectional view of the opening device of the first exemplary embodiment in various operating positions; and FIG. 9 shows a schematic representation of a sensor arrangement for triggering an opening device.

DETAILED DESCRIPTION

Figure 1A:
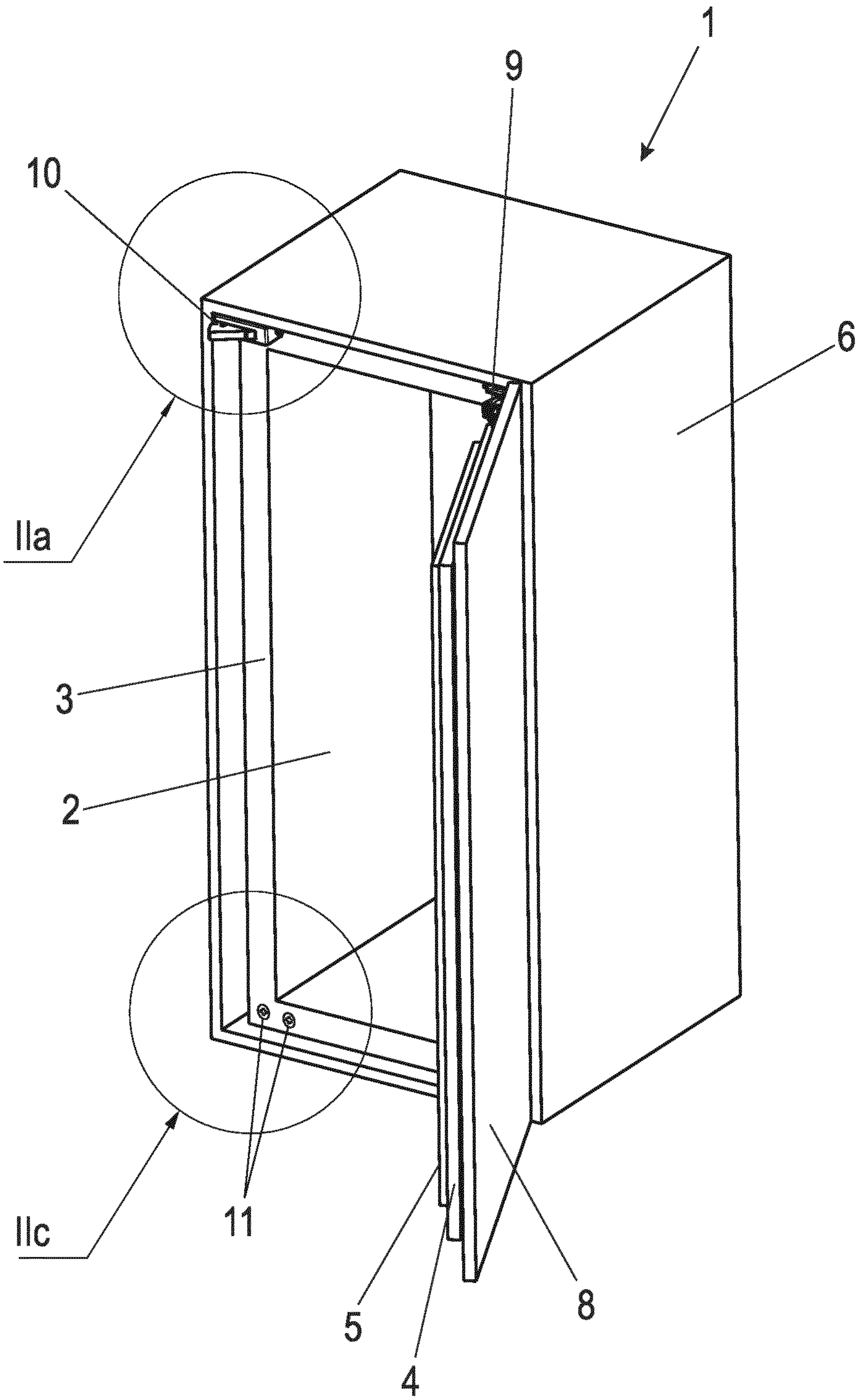
Figure 1B:
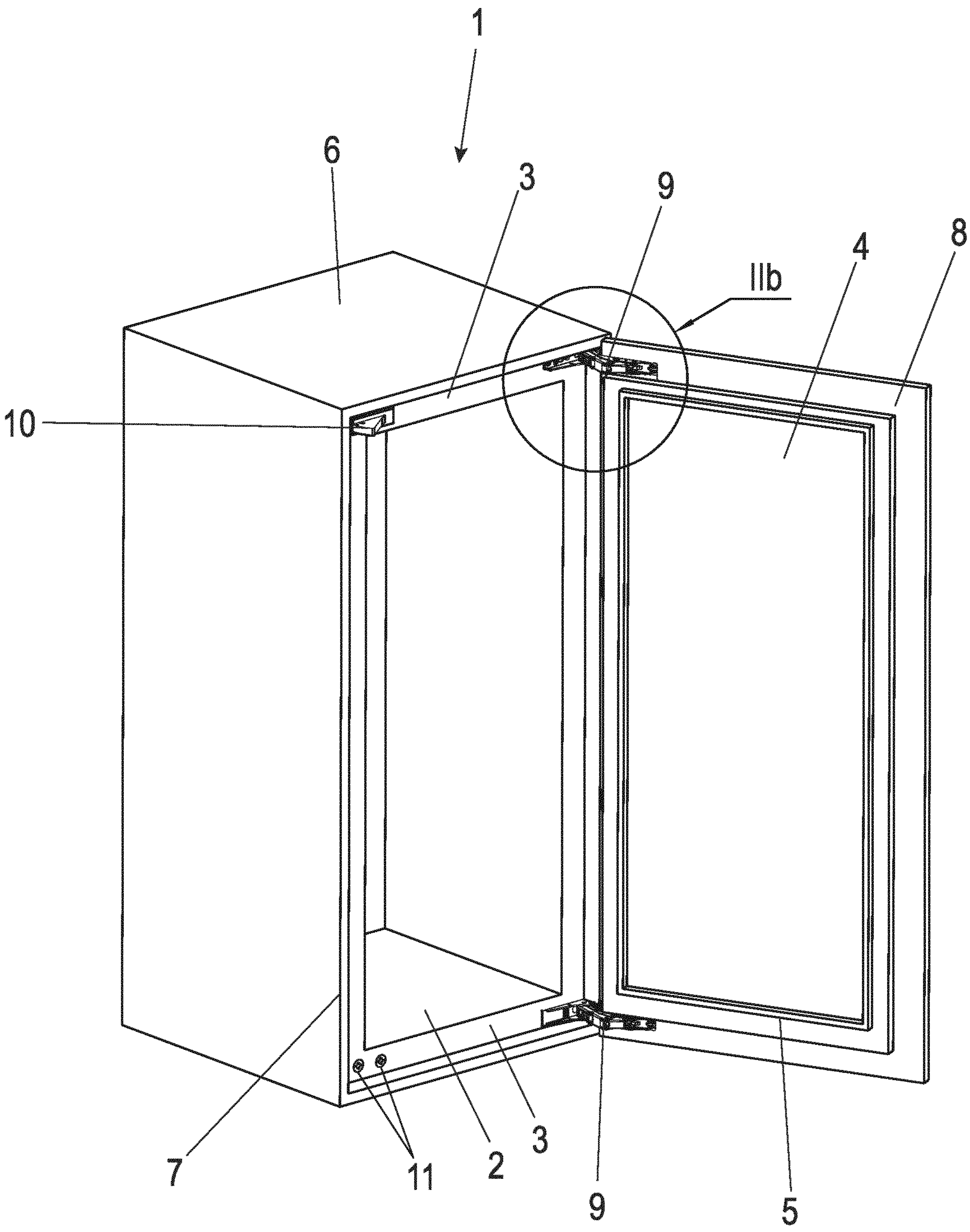

FIGS. 1*a* and 1*b* each show an isometric representation of a cooling device 1. The cooling device 1 may be, for example, a refrigerator or a freezer for use in the household or also for commercial use.

The cooling device 1 has a thermally insulated body, hereinafter referred to as insulating body 2, the interior of which and its front end face 3 are visible in the figures shown. Associated with the insulating body 2 is a thermally insulated door, hereinafter referred to as insulating door 4, which has a circumferential seal 5, usually a magnetic seal. When the insulating door 4 is closed, the seal 5 rests circumferentially on the front end face 3 of the insulating body 2 and thus hermetically seals the interior of the insulating body 2.

In the cooling device 1 shown, the insulating body 2 is installed in a furniture body 6, with which a body door 8 is associated, which in the closed state rests against a front end face 7 of the furniture body 6.

In the exemplary embodiment shown, the body door 8 and the insulating door 4 form a permanently connected unit. Alternatively, the body door 8 can also be connected to the insulating door as a so-called trailing door. The body door 8 projects outwards on all sides over the insulating door 4. The insulating door 4 is pivotably connected to the insulating body 2 of the cooling device 1 via door hinges 9. The actual hinge mechanism of the respective door hinge 9 is thereby arranged above or below the insulating door 4, so that it lies outside the insulated interior of the insulating body 2 when the cooling device 1 is dosed. The body door 8 is connected to the insulating door 4 to form a unit via a door connector which is not visible in FIGS. 1*a* and 1*b* and is supported by the insulating door 4. The door connector usually also serves to align the body door 8 relative to the insulating door 4 in possibly all three spatial directions. In this way, gap-free contact of both doors with the respective end face of the corresponding body can be achieved.

An opening device 10 is arranged in the upper left corner area of the insulating body 2, which is used for electrically driven pushing open of the door assembly, i.e., the unit consisting of body door 8 and insulating door 4.

Figure 2A:
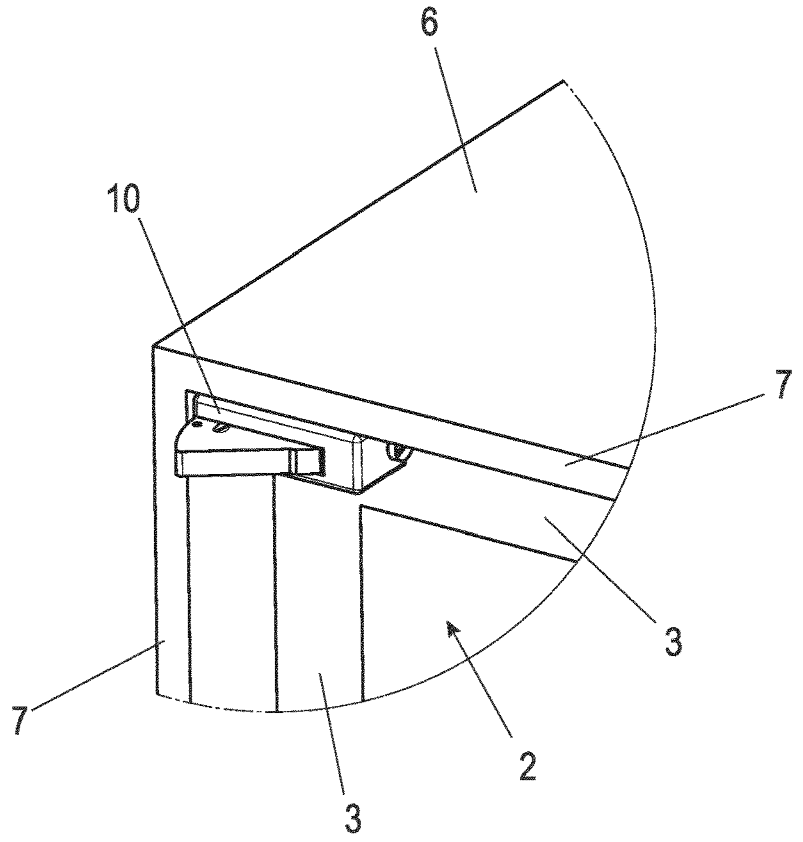
Figure 2B:
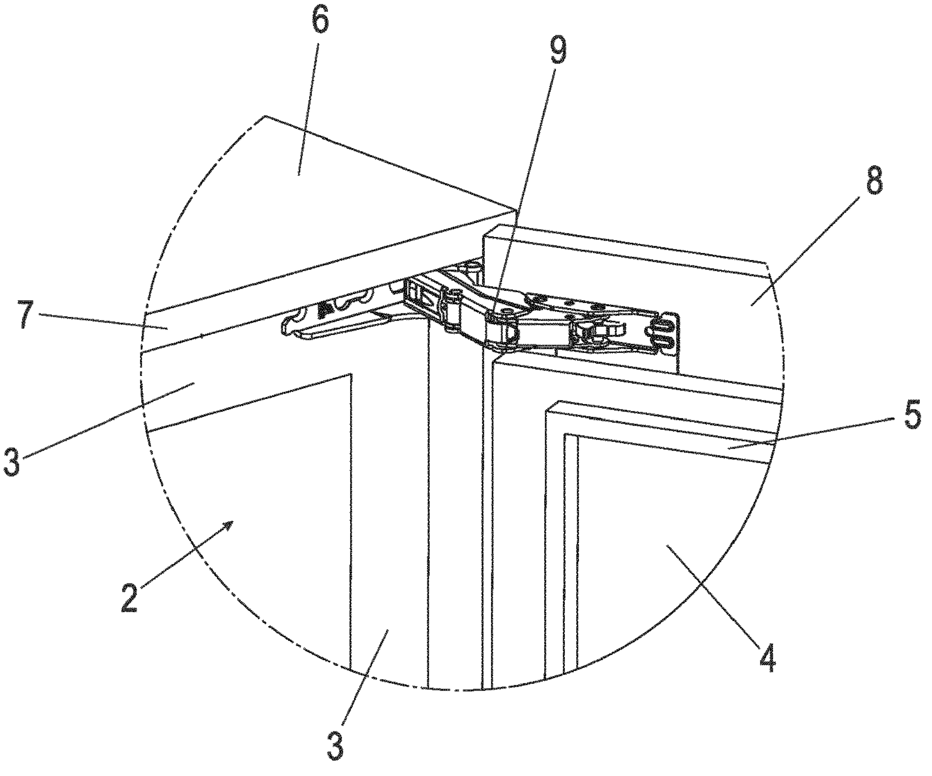

The arrangement of the opening device 10 or the door hinge 9 in the upper area of the cooling device 1 is shown again in more detail in the cut-out enlargements in FIGS. 2*a* and 2*b*, respectively. The door hinge 9 used is, for example, a so-called seven-joint hinge which has seven different points of articulation. Such hinges have become a standard feature in cooling devices, as they can be used to achieve a suitably guided opening movement of the door assembly.

For the door hinge 9, an installation space of a certain width, depth and height is available in the corner area of the insulating body 2. The width extends in a horizontal direction along the front end face 3, the height extends in a vertical direction along the end face 3 and the depth extends in a direction perpendicular to the end face 3 of the insulating body 2.

In particular, the depth is standard for the commonly used door hinges 9 and is about 42 mm. The depth indicates the distance between the end face 3 of the insulating body 2 and the surface of the body door 8 facing the insulating body 2. The door hinge 9 rests against the two surfaces mentioned, the front end face 3 and the inner surface of the body door 8, respectively, with contact surfaces and is fastened to these elements by securing units, usually screws. As a rule, the position of the securing units is also fixed as standard. In particular, in the insulating body 2 of the cooling device 1 there are prefabricated securing units, e.g., screwing facilities arranged so that the door hinge 9 can be screwed onto the end face 3 in the corner area. The securing units can be provided, for example, by inserted or pressed-in threaded bushes.

The cooling device 1 allows, as is usual for cooling devices, a left- or right-sided door hinge. For this purpose, the mentioned securing units for the door hinge(s) 9 are not only provided on the right side of the insulating body 2, but mirror-invertedly on the left side. The door hinge(s) 9 can thus also be screwed onto the left side of the cooling device in the upper left or lower left corner without any other structural changes. In the case of non-symmetrically constructed door hinges 9, these are exchanged crosswise when the door hinge is changed, i.e., the upper right door hinge 9 is inserted at the bottom left and the lower right door hinge 9 at the top left.

In the arrangement shown, the installation space that would be available for the upper door hinge 9 with the door hinged on the left is occupied by the opening device 10. Advantageously, the opening device 10 is not only positioned in this installation space, but also uses the prepared securing units for the door hinge 9. With the door hinged on the left, the door hinge 9 would correspondingly use these securing units on the left side, whereas the opening device 10 would use the securing units used by the upper door hinge 9 in the illustrated state in the upper right corner area of the insulating body 9.

Figure 2C:
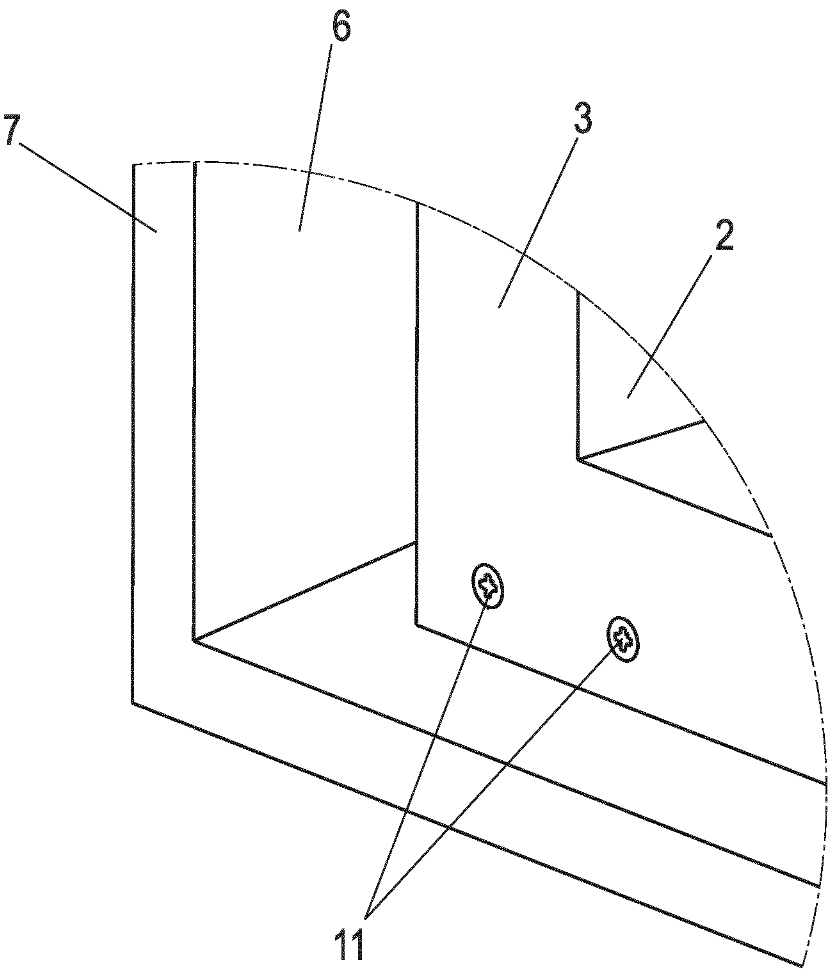

It is noted in this connection that an open ng device 10 may be arranged not only in the upper but also in the lower region of the cooling device 1 or both in the upper and in the lower region. Thus, the opening device 10 could also use the securing units for the lower of the two door hinges 9 on correspondingly the side on which the door hinge is not installed. The securing units in the lower left corner area of the cooling device 1 are shown in FIGS. 1*a* and 1*b*. FIG. 2*c* shows the lower left corner area of the cooling device 1 in a cutaway enlargement. The securing units in this case are threaded inserts 11 in the front end face 3 of the insulating body 2, into which a fastening screw is screwed in this illustration in order to cover the threaded inserts 11 when they are not in use.

Figure 3A:
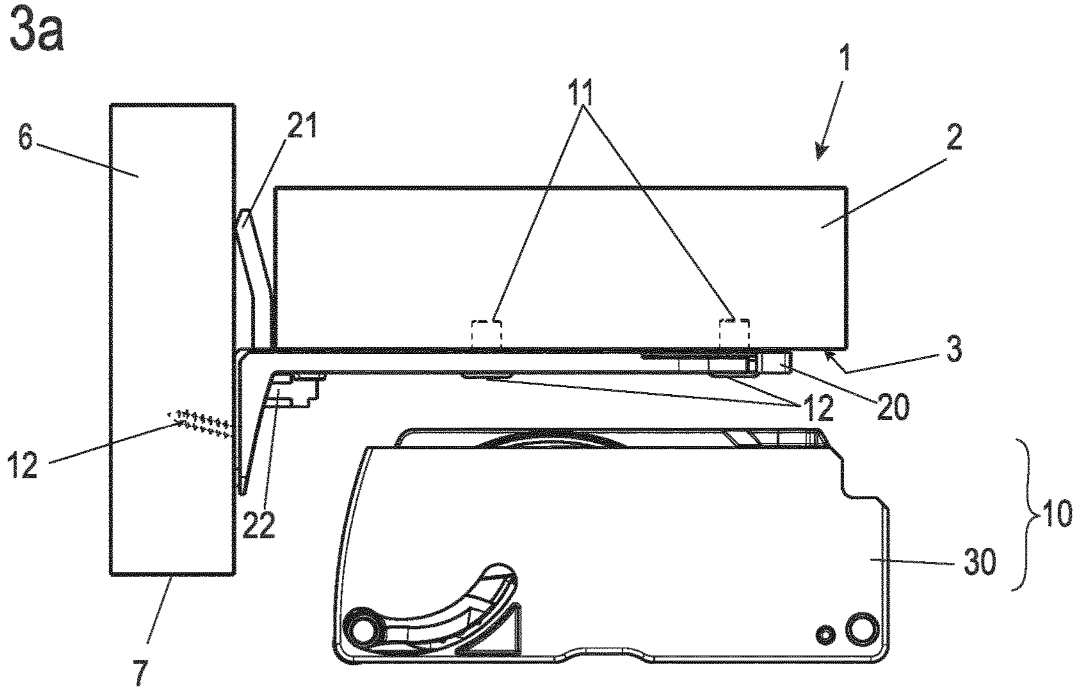
Figure 3B:
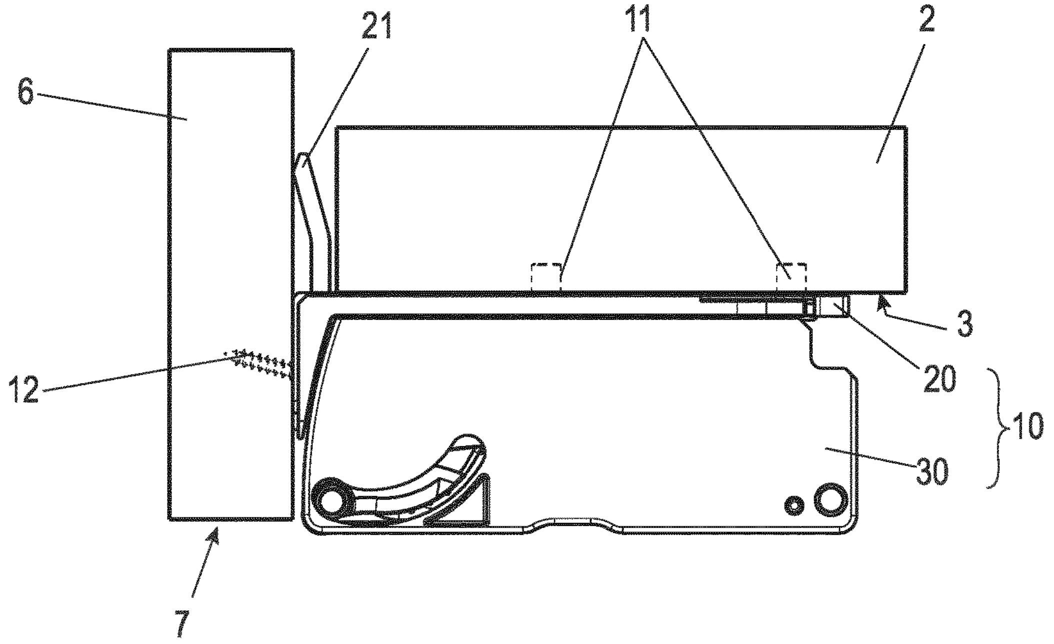

In FIGS. 3*a* and 3*b*, a first exemplary embodiment of an opening device 10 is shown, which is arranged in an upper or lower corner region of an insulating body 2 of a cooling device 1, which is otherwise not further shown here. The figures show a top view of the corner region, wherein a part of the insulating body 2 can be seen, as well as a side wall of the furniture body 6.

The opening device 10 is constructed in two parts with a mounting base 20 and a functional unit 30 that is removable from the mounting base 20.

To mount the opening device 10, the mounting base 20 is first attached to the cooling device 1 and the furniture body 6 in the corner area mentioned. For this purpose, (threaded) screws 12 are screwed into the threaded inserts 11 of the cooling device 1. As previously explained, the threaded inserts 11 are the attachment points for the door hinges already provided in the insulating body 2 of the cooling device 1, which are unused and available on the side opposite the inserted door hinges 9.

In the present example, the mounting base 20 is designed in the form of an L-shaped angle, which rests on the insulating body 2 with a longer leg. A shorter leg of the mounting base 20 is supported on the furniture body 6. It may be provided that a fastening hole 23 is also provided here in the mounting base 20, through which a self-tapping screw 12 can be screwed into the furniture body 6.

According to the application, contacts 22 are arranged on the mounting base 20, which is connected to a connecting cable 21 of the opening device 10. In the illustrated exemplary embodiment, the contacts 20 are arranged in a plug connector positioned in a corner region of the mounting base 20, which is formed in an angular shape. Generally, a gap remains between the insulating body 2 of the cooling device 1 and the side wall of the furniture body 6, through which the connection cable 21 can be passed in order to connect it to a mains supply in the rear region of the cooling device 1, which is not visible here, possibly via an interposed power supply unit. In addition to power supply lines, the connection cable 21 can also comprise signal lines in order to connect the opening device to a sensor arrangement. An example of a sensor arrangement via which a manually initiated opening of the door assembly of the cooling device 1 is detected in order to trigger the function of the opening device 10 is shown in FIG. 9.

In the next step, the functional unit 30 is attached to the screwed-on mounting base 20. This fastening is advantageously carried out by means of a tool-free (latching) mechanism. When the functional unit 30 is attached, an electrical connection is established with the contacts 22 and thus the connecting cable 21 via mating contacts of the functional unit 30 that are not visible in FIGS. 3*a* and 3*b*.

Due to the two-part design of the opening device 10 with mounting base 20 and functional unit 30, the functional unit 30 can be replaced so easily without having to disconnect or reconnect the wiring of the connection cable 21 or having to re-route the connection cable 21. Replacement of the functional unit 30 may be for repair, service and/or cleaning purposes, for example. The replacement may be performed by the user or an unskilled service technician.

Figure 4:
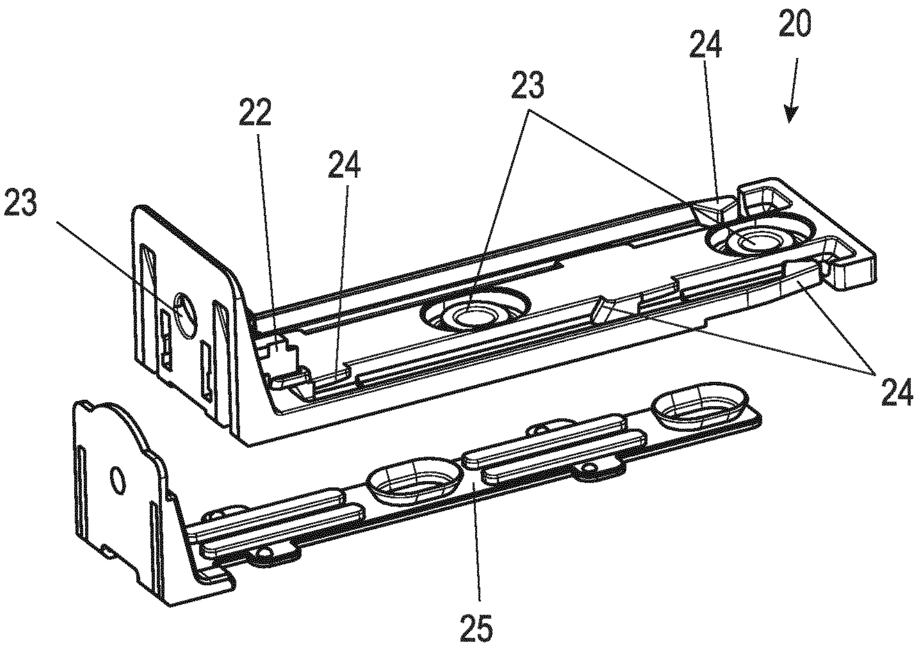
FIG. 4 shows an isometric view of a mounting base of the opening device of the first exemplary embodiment.

FIG. 4 shows the mounting base 20 of the exemplary embodiment of FIGS. 3*a* and 3*b* in more detail in an isometric view. In the example shown, the mounting base 20 itself is constructed in two parts, wherein a soft intermediate layer 25 is provided onto which an upper part of the mounting base 20 is placed. The upper part may be made of a hard plastic; and the intermediate layer 25 may be made, for example, of a soft plastic, a rubber, or an elastomer. A high stability of the mounting base 20 is achieved and, at the same time, a good sound decoupling and/or sound absorption is achieved so that vibrations generated by the opening device 10 are, as far as possible, not transmitted as structure-borne sound to the cooling device 1 or the furniture body 6.

In addition to the contacts 22 as mentioned above, the mounting base 20 has mounting holes 23, which can be designed as slotted holes, in order to be able to move the mounting base 20 on the insulating body 2 and thus compensate for different gap dimensions between the cooling device 1 and the furniture body 6. Another possibility for compensating for different gap dimensions is provided by interposed spacer plates. Furthermore, securing means 24 are arranged on the mounting base 20, which serve to fasten the functional unit 30 to the mounting unit 20. These can be latching elements and/or guides, optionally with undercuts.

Figure 5:
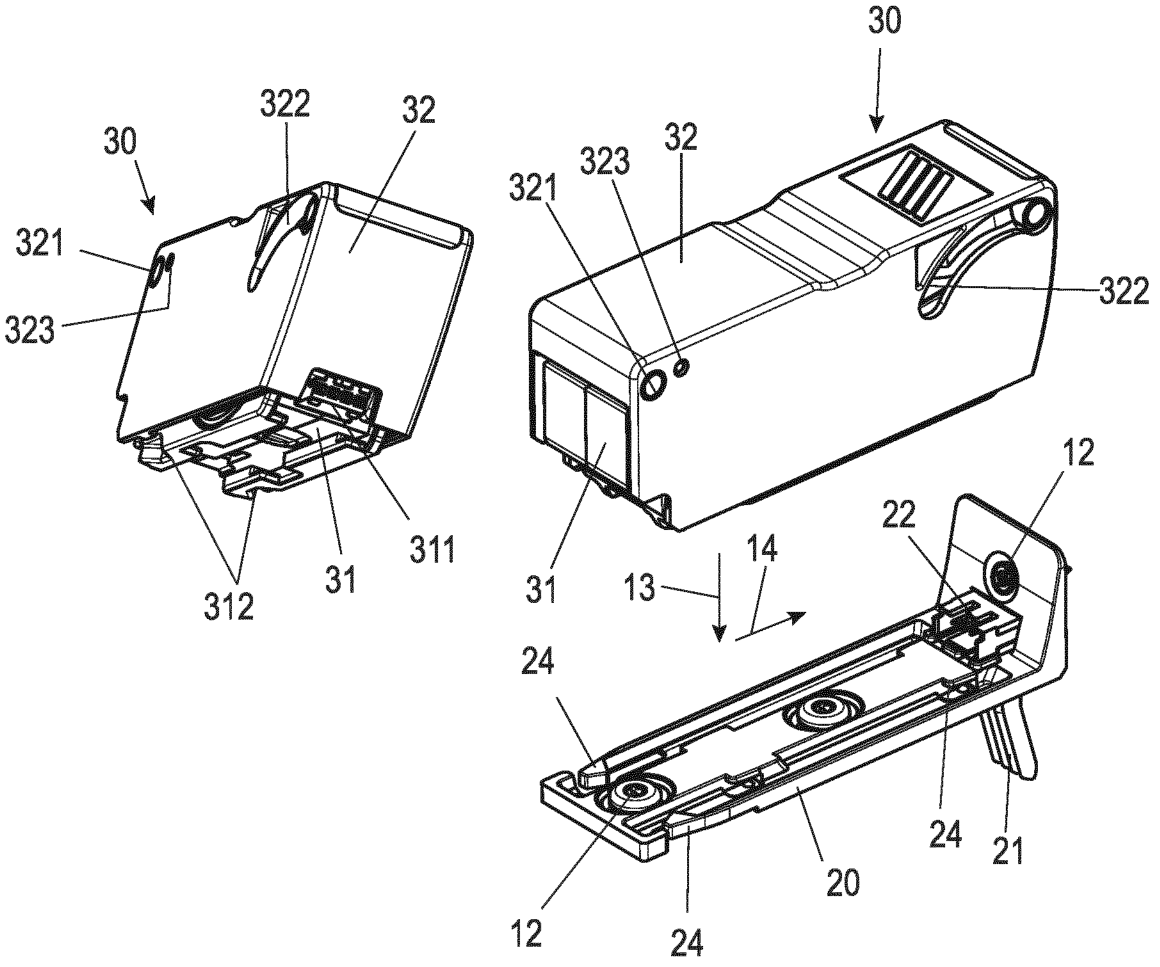
FIG. 5 shows different isometric representations of the mounting plate and a functional element of the opening device of the first exemplary embodiment.

FIG. 5 shows in its right part the opening device 10 with separated mounting base 20 and functional unit 30 again in an isometric view. In the left part of the figure, the functional unit 30 is shown from a different perspective.

The fastening of the functional unit 30 to the mounting base 20, as already mentioned in connection with FIG. 4, is shown in more detail in FIG. 5. As securing means 24, latching elements and guide webs with undercut regions are provided on the mounting base 20 in order to be able to slide the functional unit 30 onto the mounting base. The functional unit 30 has securing means 312 cooperating therewith.

The movement sequence provided for fastening is shown by two movement arrows 13, 14. In the exemplary embodiment shown here, it is provided to first pace the functional unit 30 on the mounting base 20 and then to push it parallel to the longer leg of the mounting base 20 in the direction of the shorter leg, as shown by the movement arrow 14. In the process, sections of the functional unit 30 engage behind corresponding sections of the guide webs of the mounting base 20 and, at the same time, mating contacts 311 of the functional unit 30 contact the contacts 22 of the mounting base 20. At the end of the sliding movement, symbolized by the movement arrow 14, the functional unit 30 latches with its securing means 312 with the latching means of the mounting base 20, as a result of which the functional unit 30 is fixed in the pushed on position. Additional fixing elements such as screws or a spot pin may be provided.

FIG. 5 also shows details of the structure of the functional unit 30, which has a base body 31 whose underside is pushed onto the mounting base 20 and on which the aforementioned mating contacts 311 are also arranged.

The functional unit 30 further comprises an ejection element 32 which swings open when the opening device 10 is functioning, in order to push open the door assembly (cf. insulating door 4 and body door 8 in FIGS. 1*a* and 1*b*) of the cooling device 1. The ejection element 32 is hood-shaped and is slipped over the base body 31. It is provided with a pivot bearing bore 321, by means of which it is mounted on the base body 31. In addition, a guide curve 322 is formed on the ejection element 32, the function of which will be explained in more detail in connection with FIGS. 7 and 8*a*-*c*. In addition, a further pivot hearing bore 323 is formed on the ejection dement 32, the function of which will also be explained below. Along the edge with which the ejection element 32 rests against the door assembly, a soft component can be arranged, in particular extrusion-coated or integrally co-formed in a coextrusion process.

Figure 6:
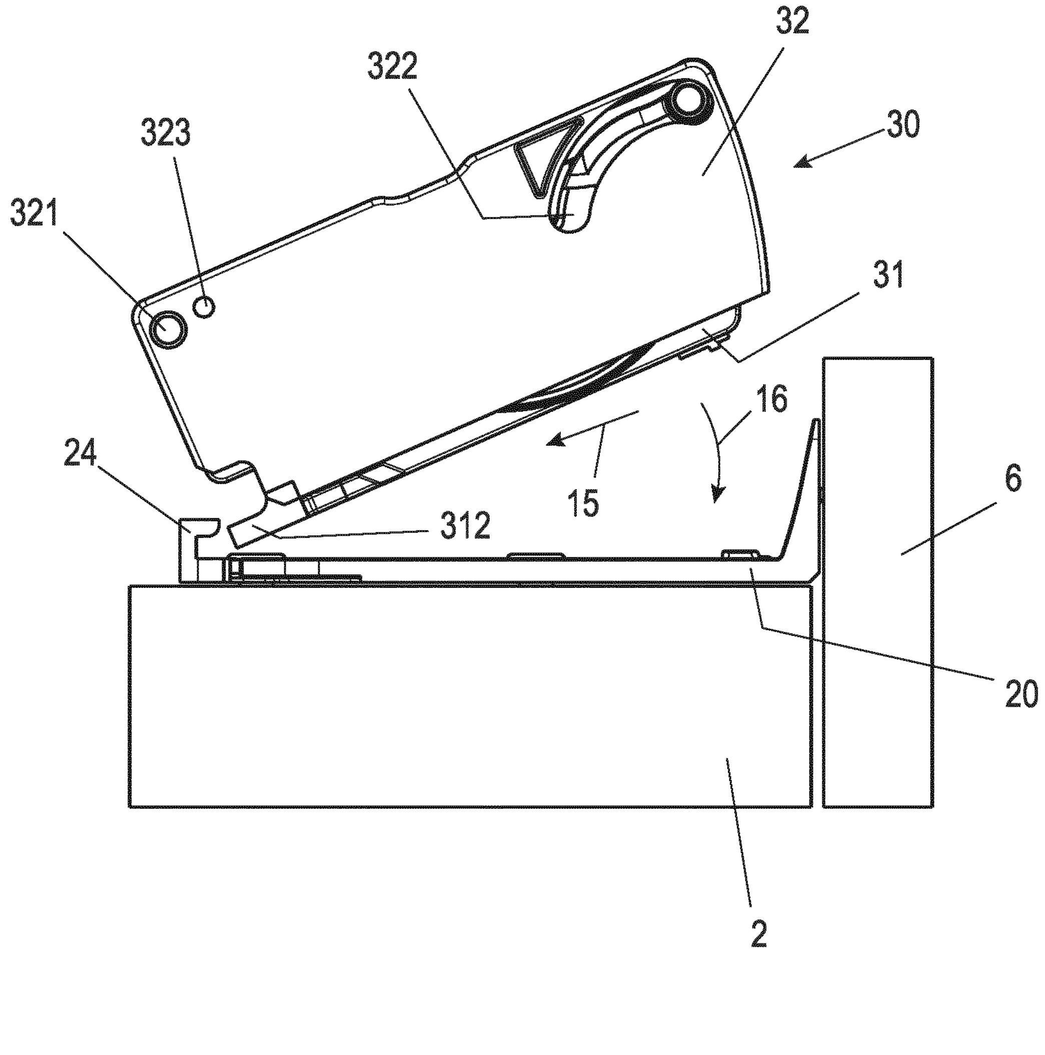
FIG. 6 shows a side view of a second exemplary embodiment of an opening device during assembly.

FIG. 6 shows a further exemplary embodiment of an opening device 10, which differs from the previously shown exemplary embodiment in the way the functional unit 30 is attached to the mounting base 20. With regard to the other function of the opening device 10, reference is made to the following explanations concerning the first exemplary embodiment.

In contrast to the previously described exemplary embodiment, the functional unit 30 is not attached to the mounting base 20 by placing it on and moving it, but by hooking it in and pivoting it in. The hooking in is symbolized by a movement arrow 16 and the pivoting in by a movement arrow 16. For hooking in, the functional unit 30 in this example has a rearwardly projecting projection as securing means 312 and the mounting base 20 has a receptacle as securing means 24, into which the projection is inserted. After insertion, the functional unit 30 is pivoted onto the mounting base 20 at its end opposite the projection and latches there with latching means, which are not visible in FIG. 6.

Corresponding to the changed movement sequence, the contacts 22 (not visible here) and the mating contacts 311 are also arranged differently and, in particular, have a different mating direction than in the first exemplary embodiment, which is adapted to the pivoting in according to the movement arrow 16.

Figure 7:
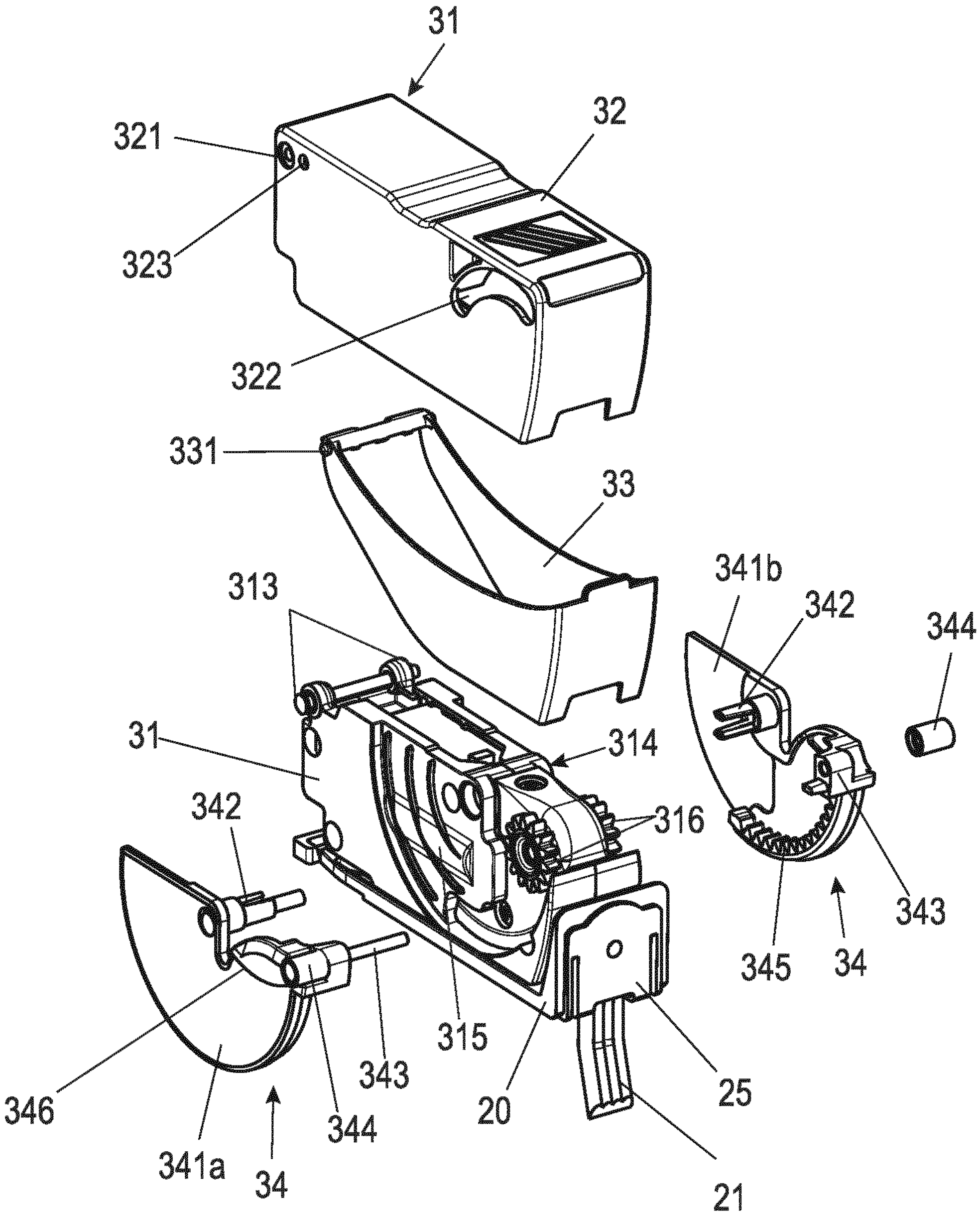
FIG. 7 shows an isometric exploded view of the opening device of the first exemplary embodiment.

FIG. 1 shows the structure of the opening device 10 of the first exempt pry embodiment in more detail, The internal structure of the functional unit 30 visible in FIG. 7 and the functionality achieved thereby are also implemented in an analogous manner in the second exemplary embodiment according to FIG. 6.

FIG. 7 shows the opening device 10 in the form of an isometric exploded diagram. The base body 31 of the functional unit 30 is inserted into the mounting base 20. The ejection element 32 is placed on the base body 31 in the manner of a hood, wherein bearing pins 313 are formed on the base body 31, which engage on both sides in the corresponding pivot bearing bore 321 of the ejection element 32, so that the latter is pivotably fastened to the base body 31.

On the side of the base body 31 opposite the bearing pins 313, a semicircular pivoting element 34 is rotatably mounted on the base body 31. The pivoting element 34 is composed of two circular segments 341*a*, 341*b*, each of which is placed on the base body 31 from one side, wherein a rotating shaft 342 is rotatably mounted in a bearing bore 314. The assembled circle segments 341*a*, b are connected to each other in the rotating shaft 342 and in a connecting shaft 343 arranged eccentrically to this.

The connecting shaft 343 projects outwardly beyond outer surfaces of the circular segments 341*a*, *b*, and rotatably mounted rollers 344 are mounted on the connecting shafts 343 in the projecting region. These rollers 344 engage with the aforementioned guide curves 322 of the ejection element 32. When the pivoting element 34 is pivoted, the milers 344 move along the guide curve 322 and pivot the ejection element 32 out. This will be described in further detail in connection with FIGS. 8*a*-8*c*.

To move the pivoting element 34 and thus to move the ejection element 32, a motor 315 is arranged in the base body 31, which acts on two drive gears 316 via gear unit (not visible here), which in turn interact with a gear segment 345 of each circular segment 341*a*, *b*. The gear unit may be a worm gear, for example. Preferably, the motor 315 may be resiliently mounted to provide as silent and vibration-free a drive as possible. Additionally, a weight piece may be attached to the motor 315 as a mass transducer to further reduce vibration amplitudes.

The gear segment 345 represents a section of an internal gear (also caned a ring gear). As the drive gears 316 rotate, the pivoting element 34 pivots about the rotating shaft 342.

In addition, there is also an apron 33 arranged between the base body 31 and the ejection element, which is pivotally mounted in the ejection element 32 in pivot bearing bores 323 by means of bearing pins 331. The pivot bearing 323 is adjacent to the pivot bearing 321 by means of which the ejection element 32 is mounted on the base body 31. The apron 33 has the function of a pinch protection, as will also be explained in connection with FIGS. 8*a*-8*c* described below.

In FIGS. 8*a*-8*c*, the functional unit 30 is shown in three different functional positions, namely in FIG. 8*a* in a retracted position, in FIG. 8*b* in a partially extended position and in FIG. 8*c* in a fully extended position of the ejection element 32. The figures each show the functional unit 30 in the upper part of the figure without the ejection element 32 in a side view and in the lower part of the figure with the ejection element 32 in a sectional view. The section is shown in a plane perpendicular to the pivot axis of the ejection element 32 straight between the ejection element 32 and the apron 33, so that the base body 31 and the apron 33 are visible in a side view, and only the ejection element 32 is visible in section.

The extension of the ejection element 32 is based on a rotation of the pivoting element 34, whose rotational movement is converted into a pivoting movement of the ejection element 32 via the rollers 344. The guide curve 322 thereby enables a larger pivoting angle of the ejection element 32 than would result from the rotary motion of the pivoting element 34 alone. The shaping of the guide curve 322 also influences the angular dependence of the movement of the ejection element 32 depending on the angle of rotation of the pivoting element 34. In this way, the most effective ejecting movement possible can be achieved, which has a large ejecting force at the beginning of the movement sequence, which is advantageous for overcoming magnetic locking forces of the door assembly of the cooling device 1. Afterwards, a pushing up with a higher speed takes place in order to be able to push the door assembly open far enough. Progressive motion kinematics are thus generated.

When the ejection element 32 pivots, the apron 33 also pivots, but by a smaller angle of deflection just so that a gap between the base body 31 and the ejection element 32 is dosed at all times to prevent a finger, for example, from becoming trapped when the ejection element 32 is retracted.

In order to suitably entrain the apron 33, at least one cam-like projection 346 is formed on the outside of the pivoting element 34 at the circular segments 341*a, b*, which presses on an upper or lower edge of the apron 33 and moves it along accordingly. The shaping of the projection 346 in conjunction with the shaping of the edges of the apron 33 determines the movement sequence that the apron 33 undergoes during the movement of the pivoting element 34. Alternatively, or additionally, a cam-like projection can also be formed on the ejection element 32 (in this case pointing inwards), which moves the apron 33 along with it.

A projection 346 may be provided for each direction of movement so that the apron 33 is constrained to move with it in both directions.

It is also conceivable to pretension the apron 33 in one direction by a spring and to make only one movement against the spring tension by a projection 346 on the side of the upper or lower edge of the apron 33. In that case, however, the apron 33 is not constrained in both directions.

In an alternative design, another coupling may be provided between the apron 33 and the pivoting element 34. For example, the apron 33 may include an inwardly facing phi that moves along a guide groove formed in the outer surface of the respective circular segment 341*a, b*.

The extension or retraction of the ejection element 32 may be effected by energizing the motor 315 in the appropriate polarity. At least one limit stop switch can be provided, which is arranged inside the base body 31 and is actuated, for example, by an inward-facing cam on one of the circuit segments 341*a, b* and stops the motor 315 in an end position. In principle, both end positions can thus be determined via switches.

It is also conceivable to determine only one end position via such a switch and to control the movement to the other end position by detecting an angle of rotation of the motor 315. To detect the angle of rotation of the motor 315, the motor 315 may be equipped with a rotary encoder, e.g., a Hall sensor. Alternatively, there may be electronic detection of current pulses generated when the motor 315 is commutated. From the current pulses, the motor rotation can be derived if the motor 315 is a mechanically commutated motor. If an electronically commutated motor is used as the motor 315, the commutation information is inherently present when the motor is controlled and can be used to determine the angle of rotation.

Likewise, it is possible for a circuit driving the motor 315 to monitor the current draw of the motor 315 and detect a mechanical end stop due to the increased current draw and then stop the motor 315.

An electronic circuit for controlling the motor 315 and/or evaluating limit switches is preferably arranged in the functional unit 30, e.g., in the base body 31.

For triggering the opening device, a sensor can be arranged on the cooling device 1 or on the furniture body 6, which detects a manually initiated opening process of the door assembly, whereupon the ejection process of the opening device 10 is started.

FIG. 9 shows an example of a sensor arrangement 40 suitable for this purpose, which is positioned on the non-hinged door side on the furniture body 6.

The sensor arrangement 40 comprises a pressure-dependent resistor 42 embedded in an elastic sheath 41. On the back of the sheath there is preferably an adhesive foil which allows easy mounting. Alternatively, or additionally, a screw fastening may be provided. The sheath 41 has an actuator 43 at a suitable location, which slightly protrudes. Instead of the elastic sheath 41, a fixed housing can also be provided in which the pressure-dependent resistor 42 is arranged and from which a movable actuator 43 protrudes.

The pressure-dependent resistor 42 (FSR—force sensitive resistor) changes its resistance value when force is applied. The sensor arrangement 40 is positioned so that the closed body door 8 presses on the pressure-dependent resistor 42 via the actuator 43. If this pressure is removed when the body door 8 is moved, the resistance value of the pressure-dependent resistor 42 changes, which is detected by a corresponding monitoring circuit.

Instead of the pressure-dependent resistor 42, a detection of the movement of the body door 8 can also be carried out via a mechanical pushbutton, a reflex light barrier, a strain gauge, a piezo element, or a magnetic sensor in connection with a permanent magnet arranged in the body door 8.

For triggering the opening device, other alternative sensors known in the art can also be used, which are positioned on the furniture body 6 or on the insulating body or on one of the doors 4, 8. Alternatively or in addition to a sensor, the triggering of the opening device can also be triggered by a control device of the refrigerator 1, e.g., a touch screen, or via a network-capable or a SmartHome-capable device, e.g. a smartphone or a voice input device.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

1 Cooling device
2 Insulating body
3 Front end face (of the insulating body)
4 insulating door
5 (Magnetic) seal
6 Furniture body
7 Front end face (of the furniture body)
8 Body door
9 Door hinge
10 Opening device
11 Threaded insert
12 Screw
13 Movement arrow (placing)
14 Movement arrow (pushing)
15 Movement arrow (hooking in)
16 Movement arrow (pivoting)
20 Mounting base
21 Connection cable
22 Contact
23 Mounting hole
24 Securing means
25 Intermediate layer
26 Receptacle
30 Functional unit
31 Base body
311 Mating contact
312 Securing means
313 Bearing in
314 Bearing bore
315 Motor
316 Drive gear
32 Ejection element
321 Pivot bearing bore
322 Guide curve
323 Pivot bearing bore
33 Apron
331 Bearing pin
34 Pivoting element
341*a, b* Circle segment
342 Rotating shaft
343 Connecting shaft
344 Roller
345 Gear segment
346 Projection
40 Sensor arrangement
41 Sheath
42 Pressure-dependent resistance
43 Actuator

The invention claimed is:

1. An opening device for a cooling device having a door assembly, the opening device comprising:

a mounting base configured for mounting on securing units for a door hinge of the cooling device; and a functional unit having an ejection element that is extendible under electrical control, wherein the mounting base has contacts and the functional unit has mating contacts, wherein the contacts and the mating contacts contact each other when the functional unit is secured to the mounting base so as to supply power to the functional unit, wherein the contacts of the mounting base are connected to a connecting cable comprising power supply lines, wherein the mounting base has mounting holes configured to connect to the cooling device and a furniture body in which the cooling device is accommodated, and wherein the mounting base is configured to define a minimum distance between the furniture body and the cooling device for passing through the connection cable by having a portion of the mounting base, which is configured to be mounted on the cooling device, extend beyond the cooling device and the gap to the furniture body.

2. The opening device of claim 1, wherein the mounting base and the functional unit include mutually engaging securing means for securing the functional unit to the mounting base.

3. The opening device of claim 2, wherein the securing means are configured for a tool-free securing of the functional unit to the mounting base.

4. The opening device of claim 3, wherein the securing means comprise latching means, guide webs, hooks, eyelets, or undercuts.

5. The opening device of claim 1, wherein the ejection element has a maximum stroke of 40 mm to 80 mm.

6. The opening device of claim 1, wherein the opening device has a depth between 38 and 47 mm.

7. The opening device of claim 1, wherein the ejection element is pivotally mounted on a base body and, in a non-pivoted position, the ejection element surrounds the base body in a hood-like manner on at least four sides.

8. The opening device of claim 7, further comprising:

a pivoting element pivotally mounted on the base body and having at least one internal gear segment coupled to an electric motor via a drive gear and pivotable by the electric motor relative to the base body.

9. The opening device of claim 8 the pivoting element entrains the ejection element.

10. The opening device of claim 8, wherein the pivoting element entrains the ejection element via at least one roller eccentrically arranged on the pivoting element, the at least one roller arranged to move along a guide curve of the ejection element.

11. The opening device of claim 8, further comprising:

an apron pivotally mounted on the base body or the ejection element and extending between the base body and the ejection element as a pinch protection.

12. The opening device of claim 11, wherein the apron is forcibly entrained by the pivoting element and/or the ejection element in at least one direction of movement.

13. The opening device of claim 8, wherein the electric motor is coupled to the drive gear via a worm gear.

14. The opening device of claim 8, wherein the electric motor is mounted in or on the base body in a vibration-damping manner.

* * * * *